United States Patent [19]

Grimm et al.

[11] Patent Number: 5,686,139
[45] Date of Patent: Nov. 11, 1997

[54] PREPARATION OF FREE-FLOWING CRUMB RUBBER COMPOSITION

[75] Inventors: Donald Charles Grimm; Michael Kenneth Stockdale, both of Akron, Ohio

[73] Assignee: The Goodyear Tire & Rubber Company, Akron, Ohio

[21] Appl. No.: 762,493

[22] Filed: Dec. 9, 1996

[51] Int. Cl.⁶ .......................................... B05D 7/02
[52] U.S. Cl. ................... 427/212; 427/222; 521/41
[58] Field of Search .................... 427/212, 222; 521/41

[56] References Cited

U.S. PATENT DOCUMENTS

| | | | |
|---|---|---|---|
| 5,506,274 | 4/1996 | Brown | 427/249 |
| 5,582,864 | 12/1996 | Kiser | 427/408 |
| 5,599,868 | 2/1997 | Bohm et al. | 524/495 |

FOREIGN PATENT DOCUMENTS 471797  7/1986  U.S.S.R. .

Primary Examiner—Michael Lusignan
Assistant Examiner—Bret Chen
Attorney, Agent, or Firm—Alvin T. Rockhill

[57] ABSTRACT

By utilizing the process of the present invention, a free-flowing crumb rubber composition can be easily prepared on a commercial scale. This invention more specifically discloses a process for preparing a free-flowing crumb rubber composition which comprises the steps of:

(1) adding a wax emulsion to a latex of a rubbery polymer to produce a latex which contains the wax, wherein the wax has a melting point which is within the range of about 40° C. to about 175° C.;

(2) agitating the latex which contains the wax in a manner whereby the wax is distributed throughout the latex;

(3) coagulating the latex which contains the wax to produce a slurry of wax coated crumb rubber in water;

(4) recovering the wax-coated crumb rubber from the water in the slurry; and (5) drying the wax-coated rubbery polymer in a hot air medium under forced motion to produce the free-flowing crumb rubber composition, wherein the hot air medium is at a temperature which is within the range of about 20° C. to about 99° C.

21 Claims, No Drawings

PREPARATION OF FREE-FLOWING CRUMB RUBBER COMPOSITION

BACKGROUND OF THE INVENTION

It is often convenient for synthetic rubbers to be in the form of free-flowing crumb. In the case of free-flowing crumb rubber, the rubber is in the form of small discrete particles (crumb rubber). These particles can flow freely which makes them easy to handle and process. However, synthetic rubbers which are made by emulsion, solution or suspension polymerization techniques tend to be tacky. Consequently, particles of such synthetic elastomers usually agglomerate during storage. This in turn destroys the free-flowing nature of the crumb rubber and makes it more difficult, if not impossible, to handle and process.

The agglomeration problem associated with particles of rubbery polymers is sometimes overcome by coating the crumb with a fused resinous partitioning agent, such as polystyrene, polymethylmethacrylate, polyacrylonitrile, polyvinylchloride (PVC) or polyethylene. For instance, U.S. Pat. No. 3,813,259 refers to the use of polymethylmethacrylate as a partitioning agent and U.S. Pat. No. 4,271,213 describes the use of a mixture of styrene-butadiene copolymer resin and polymethylmethacrylate resin as a partitioning agent.

In some cases, inorganic partitioning agents, such as talc, are utilized as partitioning agents for crumb rubber. However, dry powders tend to settle out during coating applications which lead to undesirable inconsistencies. Also, in some applications, inorganic or polymeric partitioning agents cannot be tolerated. For example, the presence of talc cannot be tolerated in nitrile rubber used to make electrical cable because it can interfere with useful functional service life.

There is currently a need for an improved technique to make highly consistent free-flowing crumb rubber compositions. It is also important for such a technique to be commercially viable and to be easily implemented on an industrial basis. There is a further need to eliminate inorganic and polymeric partitioning agents from free-flowing crumb rubber compositions.

U.S. patent application Ser. No. 08/629,285, filed on Apr. 8, 1996, discloses a process for preparing a free-flowing crumb rubber composition which comprises the steps of: (1) extruding a rubbery polymer into a wax emulsion; wherein the rubbery polymer is extruded into particles having a diameter which is within the range of about 1 mm to about 15 mm; wherein the wax emulsion is comprised of about 35 weight percent to about 89 weight percent water, from about 10 weight percent to about 50 weight percent of a wax, and from about 1 weight percent to about 15 weight percent of an emulsifier; wherein the wax has a melting point which is within the range of about 40° C. to about 175° C.; and wherein the wax emulsion is at a temperature which is within the range of about 5° C. to about 70° C.; (2) agitating the wax emulsion containing the rubbery polymer to produce a wax-coated rubbery polymer; (3) separating the wax-coated rubbery polymer from the water phase so as to recover a wet wax-coated rubbery polymer; and (4) drying the wax-coated rubbery polymer in a hot air medium under forced motion to produce the free-flowing crumb rubber composition, wherein the hot air medium is at a temperature which is within the range of about 10° C. to about 50° C.

U.S. patent application Ser. No. 8/629,285 further discloses a free-flowing crumb rubber composition which is comprised of particles of a rubbery polymer having a diameter which is within the range of about 1 mm to about 15 mm, wherein the surface of the particles of rubbery polymer is coated with a wax having a melting point which is within the range of about 40° C. to about 175° C., and wherein the free-flowing crumb rubber composition contains from about 1 weight percent to about 10 weight percent of the wax.

SUMMARY OF THE INVENTION

By utilizing the technique of this invention, free-flowing crumb compositions can easily be made on a commercial basis without utilizing inorganic or polymeric partitioning agents. This process offers the advantage of being highly energy-efficient because an extrusion step is not required. By eliminating the extrusion step, labor requirements are also reduced. The elimination of extrusion equipment also, of course, lowers cost by reducing capital requirements and precludes the possibility of mechanical failure of the extruder.

The subject invention more specifically discloses a process for preparing a free-flowing crumb rubber composition which comprises the steps of:

(1) adding a wax emulsion to a latex of a rubbery polymer to produce a latex which contains the wax, wherein the wax has a melting point which is within the range of about 40° C. to about 175° C.;

(2) agitating the latex which contains the wax in a manner whereby the wax is distributed throughout the latex;

(3) coagulating the latex which contains the wax to produce a slurry of wax-coated crumb rubber in water;

(4) recovering the wax-coated crumb rubber from the water in the slurry; and (5) drying the wax-coated rubbery polymer in a hot air medium under forced motion to produce the free-flowing crumb rubber composition, wherein the hot air medium is at a temperature which is within the range of about 20° C. to about 99° C.

DETAILED DESCRIPTION OF THE INVENTION

The technique of this invention can be used to make a free-flowing crumb of virtually any type of rubbery polymer. In most cases, the rubbery polymer will be comprised of repeat units which are derived from one or more conjugated diolefin monomers, such as 1,3-butadiene or isoprene. It can also contain repeat units which are derived from one or more monomers which are copolymerizable with the conjugated diolefin monomer, such as acrylonitrile, styrene, α-methylstyrene or n-butylacrylate. Some representative examples of rubbery polymers which can be used include: polybutadiene rubber, polyisoprene rubber, styrene-butadiene rubber (SBR), styrene-isoprene rubber (SIR), isoprene-butadiene rubber (IBR), styrene-isoprene-butadiene rubber (SIBR), nitrile rubber (NBR) or carboxylated nitrile rubber (XNBR).

In the first step of the process of this invention, a wax emulsion is added to a latex of a rubbery polymer. This can be accomplished by simply adding the wax emulsion to the latex. The amount of wax emulsion added will normally be sufficient to contain from about 1 weight percent to about 10 weight percent wax, based upon the dry weight of the rubbery polymer in the latex. The amount of wax emulsion added will preferably be sufficient to contain from about 2 weight percent to about 5 weight percent wax, based upon the dry weight of the rubbery polymer in the latex. The wax containing latex will be agitated so as to thoroughly mix the wax emulsion into the latex. This mixing step is normally carried out at a temperature which is within the range of about 5° C. to about 70° C. It is normally preferred for the mixing to be done while the latex is at a temperature which is within the range of about 20° C. to about 50° C. In any case, it is critical for the temperature of the latex to be maintained at a temperature which is less than the melting point of the wax being employed.

The wax emulsion is comprised of water, the wax and an emulsifier. The wax will have a melting point which is within the range of about 40° C. to about 175° C. It will preferably have a melting point which is within the range of about 50° C. to about 150° C. and will most preferably have a melting point which is within the range of about 60° C. to about 70° C.

The wax is an ester of a high molecular weight fatty acid with a high molecular weight alcohol other than glycerol. It will typically be a mineral wax selected from the group consisting of paraffin waxes, microcrystalline waxes, oxidized microcrystalline waxes, montan waxes, hoechst waxes and ozokerite waxes. Paraffin waxes are normally preferred.

The emulsifier can be virtually any type of anionic emulsifier or nonionic emulsifier. Some representative examples of types of anionic surfactants which can be utilized include carboxylates, alkylbenzene sulfonates, alkane sulfonates, α-olefin sulfonates, fatty alcohol sulfates and oxo-alcohol sulfates. Of the anionic emulsifiers alkyl benzene sulfonates, fatty alcohol sulfates and oxo-alcohol ether sulfates are preferred.

It is generally preferred for the emulsifier to be a nonionic emulsifier. Some representative examples of types of nonionic surfactants which can be utilized include alkylphenol ethoxylates, fatty-alcohol polyethyleneglycol ethers, oxoalcohol polyethyleneglycol ethers, ethylene oxide polymers, propylene oxide polymers and fatty alcohol polyglycol ethers. Ethoxylated alcohols are a highly preferred class of nonionic emulsifiers.

After the wax emulsion has been thoroughly mixed throughout the latex, the latex which contains the wax is coagulated. The latex which contains the wax can be coagulated using a conventional salt/acid coagulation procedure. In other words, a combination of a salt and an acid can be added to the latex to cause coagulation. Such salt/acid coagulation is typically accomplished by simply adding at least one strong inorganic acid and a salt to the latex. However, in some cases, it is preferred to coagulate the latex by the addition of only a highly effective salt, such as aluminum sulfate. Coagulation aids can also be employed in coagulation of the rubbery polymer containing emulsion. Some representative examples of strong inorganic acids which can be used in the coagulation of latex include sulfuric acid, hydrochloric acid and nitric acid with sulfuric acid being preferred. A wide variety of salts can be employed. Some representative examples of salts which can be used include sodium chloride, potassium chloride, calcium chloride, aluminum sulfate, magnesium sulfate and quaternary ammonium salts. The amount of salt and acid needed to cause coagulation will vary with the specific emulsion and with the type of salt utilized. Calcium chloride is a highly preferred salt and will normally be added in an amount which is within the range of about 13 phr to about 40 phr.

After the latex has been coagulated, a coagulated rubber slurry is formed. The rubber in the slurry is in the form of wax-coated crumb rubber. The coagulated rubber slurry is comprised of serum and the wax-coated rubber crumb. The serum is essentially the aqueous phase with the rubber crumb being the solid phase. The serum is, of course, comprised of water, emulsifier, acids, salts and other water-soluble residual compounds.

The coagulated rubber slurry is typically transferred to a conversion tank in order to complete the coagulation process. The wax-coated rubber crumb is then filtered through a shaker screen which collects the wax-coated rubber crumb and deposits it within a reslurry tank. Washing is typically employed to remove excess soap and/or electrolyte from the wax-coated crumb rubber. In the reslurry tank, the wax-coated rubber crumb is washed and agitated in fresh wash water to produce a wax-coated rubber reslurry.

The pH of the rubber reslurry can then optionally be adjusted so as to be within the range of about 5 to about 8. This neutralization step is accomplished by the addition of a base. Numerous bases known to those of skill in the art may be utilized, including calcium hydroxide, magnesium hydroxide, potassium hydroxide and sodium hydroxide. The pH of the wax-coated rubber reslurry will preferably be adjusted to be within the range of about 5.5 to about 7.5 and will most preferably be adjusted to be within the range of about 6 to about 7.

The serum from the shaker screen is then typically recycled back to the coagulator, permitting efficient use of the coagulants. The wax-coated rubber crumb from the reslurry tank then normally passes over a second shaker screen and is directed to an expeller, in which the polymer can be dewatered. The expeller typically consists of a screw which transports the rubber down a shaft of the expeller under increasingly constricting conditions. The barrel of the expeller is lined lengthwise with narrow grooves, the width of which decreases as the rubber moves through the expeller.

The water can optionally be squeezed out through the grooves while the rubber advances to an open-ended cone located at the far end of the barrel. The cone provides a back-pressure for the dewatering screw. The dewatering force can be controlled by adjusting the setting of the cone. This adjustment can vary with different types of rubber and can be altered during a finishing run to attain the desired moisture content. The moisture content of the rubber exiting the expeller is typically about 10 weight percent.

The dewatered wax-coated rubber is then typically dried. It is highly preferred for this drying step to be carried out under forced motion. The forced motion must be sufficient to keep the wax-coated crumb rubber from agglomerating prior to being dried. The drying will typically be accomplished by passing hot air through a bed of the wax-coated crumb rubber. In one embodiment of this invention, the forced motion is provided by passing the hot air medium through the bed of wax-coated rubbery polymer particles at a velocity which is sufficient to fluidize the bed of wax-coated rubbery polymer particles. Higher drying temperatures promote faster drying which, of course, reduces the time needed for drying. However, high temperatures can lead to polymer degradation and agglomeration which limits the drying temperature which can be utilized. The maximum drying temperature is limited to a maximum of about 210° F. (99° C.) because the heat history of the rubber significantly affects ultimate properties. Drying temperatures as low as room temperature (about 20° C.) can be employed. However, in order to attain a commercially satisfactory drying rate, the temperature will normally be at least about 150° F. (66° C.). Thus, the drying temperature employed will typically be within the range of about 150° F. (66° C.) to about 210° F. (99° C.). It is normally preferred to utilize a drying temperature which is within the range of about 165° F. (74° C.) to about 195° F. (91° C.).

In a typical drying step, the wax-coated crumb rubber is air-conveyed to a cyclone, where it subsequently falls onto a metal apron and proceeds through an apron drier. The cyclone functions as a knock-out vessel that separates the rubber from the air. Consequently, the rubber falls onto the apron in a uniform, dispersed manner. The apron drier is typically a single-pass drier containing a series of heated zones which may each be set to specified temperatures. Hot air is directed through each zone at the specified temperature and removes the moisture from the wax-coated rubber. Both the zone temperatures and the apron speed may be varied to adjust the drying conditions within the apron dryer. The moisture content of the finished rubber is preferably less than about 1 percent, and more preferably below about 0.7 percent. When the rubber exits the apron dryer, it is allowed to cool and is packaged for shipping.

The free-flowing crumb rubber composition made by this process is coated on its surface with a wax having a melting point which is within the range of about 40° C. to about 175° C., wherein the free-flowing crumb rubber composition contains from about 1 weight percent to about 10 weight percent of the wax. This free-flowing crumb rubber composition is free of inorganic materials and polymeric materials other than the rubbery polymer itself. These free-flowing crumb rubber compositions should be stored at a temperature of less than about 60° F. (16°) to prevent agglomerating from occurring. It is desirable to store the free-flowing crumb rubber composition at a temperature which is no greater than about 75° F. (24° C.). It is preferable to store the free-flowing crumb rubber at a temperature of less than 40° F. (4° C.). However, it is possible to store the free-flowing crumb rubber at higher temperatures for short periods without agglomeration.

This invention is illustrated by the following examples which are merely for the purpose of illustration and are not to be regarded as limiting the scope of the invention or the manner in which it can be practiced. Unless specifically indicated otherwise, parts and percentages are given by weight.

EXAMPLE 1

In this experiment, free-flowing nitrile rubber crumb was prepared by utilizing the technique of this invention. In the procedure used, 35 pounds (15.9 of Chemigum® N615B nitrile rubber latex from The Goodyear Tire & Rubber Company was mixed with about 1 pound (0.454 kg) of Petrolite® 01 wax dispersion. This nitrile rubber contained about 33 percent bound acrylonitrile.

The latex was then coagulated by the addition of 20 pounds (9.1 kg) of coagulant which was comprised of water and 240 grams of aluminum sulfate. The coagulation was carried out at a temperature of 160° F. (71° C.). After coagulation, the wax-coated crumb rubber was twice washed with 20 gallons (76 liters) of cold tap water. The crumb rubber was then dried on a fine screen at a temperature of 120° F. (49° C.) which reduced the water content of the nitrile rubber crumb to less than 0.5 percent. The crumb rubber composition made remained free-flowing after several months of storage at room temperature (about 20° C.).

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A process for preparing a free-flowing crumb rubber composition which comprises the steps of:
   (1) adding a wax emulsion to a latex of a rubbery polymer to produce a latex which contains the wax, wherein the wax has a melting point which is within the range of about 40° C. to about 175° C.;
   (2) agitating the latex which contains the wax in a manner whereby the wax emulsion is distributed throughout the latex;
   (3) coagulating the latex which contains the wax to produce a slurry of wax-coated crumb rubber in water;
   (4) recovering the wax-coated crumb rubber from the water in the slurry; and
   (5) drying the wax-coated rubbery polymer in a hot air medium under forced motion to produce the free-flowing crumb rubber composition, wherein the hot air medium is at a temperature which is within the range of about 20° C. to about 99° C.

2. A process as specified in claim 1 wherein the amount of wax emulsion added contains from about 1 weight percent to about 10 weight percent wax, based upon the dry weight of the rubbery polymer in the latex.

3. A process as specified in claim 2 wherein the wax is a mineral wax.

4. A process as specified in claim 3 wherein the wax emulsion is comprised of the wax, water and an emulsifier, wherein the emulsifier is selected from the group consisting of anionic emulsifiers and nonionic emulsifiers.

5. A process as specified in claim 4 wherein the wax has a melting point which is within the range of about 50° C. to about 150° C.

6. A process as specified in claim 5 wherein the rubbery polymer is a nitrile rubber.

7. A process as specified in claim 5 wherein the amount of wax emulsion added contains from about 2 weight percent to about 5 weight percent wax, based upon the dry weight of the rubbery polymer in the latex.

8. A process as specified in claim 4 wherein the emulsifier is an anionic emulsifier selected from the group consisting of carboxylates, alkylbenzene sulfonates, alkane sulfonates, α-olefin sulfonates, fatty alcohol sulfates and oxo-alcohol sulfates.

9. A process as specified in claim 4 wherein the emulsifier is a nonionic emulsifier.

10. A process as specified in claim 9 wherein the nonionic emulsifier is selected from the group consisting of alkylphenol ethoxylates, fatty-alcohol polyethyleneglycol ethers, oxo-alcohol polyethyleneglycol ethers, ethylene oxide polymers, propylene oxide polymers and fatty alcohol polyglycol ethers.

11. A process as specified in claim 3 wherein the wax-coated rubbery polymer is dried in step (5) at a temperature which is within the range of about 66° C. to about 99° C.

12. A process as specified in claim 11 wherein the rubbery polymer is selected from the group consisting of polybutadiene rubbers, polyisoprene rubbers, styrene-butadiene rubbers, styrene-isoprene rubbers, isoprene-butadiene rubbers, styrene-isoprene-butadiene rubbers, nitrile rubbers and carboxylated nitrile rubbers.

13. A process as specified in claim 3 wherein the wax emulsion is comprised of the wax, water and an emulsifier, wherein the emulsifier is an ethoxylated alcohol.

14. A process as specified in claim 3 wherein the wax-coated rubbery polymer is dried in step (5) at a temperature which is within the range of about 74° C. to about 91° C.

15. A process as specified in claim 2 wherein the mineral wax is selected from the group consisting of paraffin waxes, microcrystalline waxes, oxidized microcrystalline waxes, montan waxes, hoechst waxes and ozokerite waxes.

16. A process as specified in claim 15 wherein the mineral wax is a paraffin wax.

17. A process as specified in claim 1 which further comprises the additional steps of (6) packaging the wax-coated drying polymer after the drying step; and (7) storing the free-flowing crumb rubber composition at a temperature of less than about 16° C.

18. A process as specified in claim 17 wherein the free-flowing crumb rubber is stored at a temperature of no greater than about 24° C.

19. A process as specified in claim 18 wherein the free-flowing crumb rubber contains from about 1 weight percent to about 10 weight percent of the wax.

20. A process as specified in claim 19 wherein the wax is selected from the group consisting of paraffin waxes, microcrystalline waxes, oxidized microcrystalline waxes, montan waxes, hoechst waxes and ozokerite waxes.

21. A process as specified in claim 1 wherein the wax emulsion consists essentially of the wax, water and an emulsifier.

* * * * *